(12) United States Patent
Alamouti et al.

(10) Patent No.: US 7,386,077 B2
(45) Date of Patent: *Jun. 10, 2008

(54) RECEIVER DIVERSITY TECHNIQUE FOR WIRELESS COMMUNICATIONS

(75) Inventors: Siavash Alamouti, Kirkland, WA (US); Vahid Tarokh, Madison, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/536,474

(22) Filed: Sep. 28, 2006

(65) Prior Publication Data

US 2007/0110179 A1    May 17, 2007

Related U.S. Application Data

(63) Continuation of application No. 10/873,567, filed on Jun. 22, 2004, now Pat. No. 7,120,200, which is a continuation of application No. 09/730,151, filed on Dec. 5, 2000, now Pat. No. 6,775,329, which is a continuation of application No. 09/074,224, filed on May 7, 1998, now Pat. No. 6,185,258.

(60) Provisional application No. 60/063,780, filed on Oct. 31, 1997, provisional application No. 60/059,219, filed on Sep. 18, 1997, provisional application No. 60/059,016, filed on Sep. 16, 1997.

(51) Int. Cl.
*H04L 1/02* (2006.01)

(52) U.S. Cl. .................................................. 375/347

(58) Field of Classification Search ................ 375/259, 375/267, 347, 349
See application file for complete search history.

(56) References Cited

U.S. PATENT DOCUMENTS

| 3,633,107 A | 1/1972 | Brady |
| 3,978,408 A | 8/1976 | Gupta et al. |
| 4,001,692 A | 1/1977 | Fenwick |
| 4,099,121 A | 7/1978 | Fang |

(Continued)

FOREIGN PATENT DOCUMENTS

CA    2302289    3/1998

(Continued)

OTHER PUBLICATIONS

Naguib, A. F. et al., "Space-Time Coded Modulation for High Data Rate Wireless Communications," 1997 EEE, pp. 102-109, 0-7803-4198-8/97, The Institute of Electrical and Electronics Engineers, Inc., New York, NY.

(Continued)

*Primary Examiner*—Jean B. Corrielus
(74) *Attorney, Agent, or Firm*—Powell Goldstein LLP

(57) ABSTRACT

An electronic circuit for decoding wireless communication signals comprises: a combiner adapted to receive one of an incoming time diverse or frequency diverse signal representing blocks of encoded symbols. The blocks of symbols have been transmitted by a plurality of spatially diverse antennas. The combiner is configured to combine the received encoded symbols The received encoded symbols include negated selected symbols and conjugated selected symbols. A maximum likelihood detector is configured to receive the one of a time diverse or a frequency diverse signal. The detector receives the combined encoded signals and recovers transmitted signals using a channel transfer function.

22 Claims, 2 Drawing Sheets

U.S. PATENT DOCUMENTS

| | | |
|---|---|---|
| 4,369,516 A | 1/1983 | Byrnes |
| 4,567,464 A | 1/1986 | Siegel |
| 4,577,332 A | 3/1986 | Brenig |
| 4,675,880 A | 6/1987 | Davarian |
| 4,733,402 A | 3/1988 | Monsen |
| 4,763,331 A | 8/1988 | Matsumoto |
| 4,953,183 A | 8/1990 | Bergmans et al. |
| 5,022,053 A | 6/1991 | Chung et al. |
| 5,029,185 A | 7/1991 | Wei |
| 5,088,113 A | 2/1992 | Wei |
| 5,101,501 A | 3/1992 | Gilhousen et al. |
| 5,109,390 A | 4/1992 | Gilhousen et al. |
| 5,170,413 A | 12/1992 | Hess |
| 5,202,903 A | 4/1993 | Okanone |
| 5,283,780 A | 2/1994 | Schuchman et al. |
| 5,305,353 A | 4/1994 | Weerackody |
| 5,319,677 A | 6/1994 | Kim |
| 5,369,412 A | 11/1994 | Tsujimoto |
| 5,396,518 A | 3/1995 | How |
| 5,416,797 A | 5/1995 | Gilhousen |
| 5,418,798 A | 5/1995 | Wei |
| 5,442,627 A | 8/1995 | Viterbi et al. |
| 5,457,712 A | 10/1995 | Weerackody |
| 5,461,646 A | 10/1995 | Anvari |
| 5,461,696 A | 10/1995 | Frank et al. |
| 5,479,448 A | 12/1995 | Seshadri |
| 5,481,572 A | 1/1996 | Skold et al. |
| 5,487,091 A * | 1/1996 | Jasper et al. ............... 375/347 |
| 5,499,272 A | 3/1996 | Bottomley |
| 5,553,102 A | 9/1996 | Jasper et al. |
| 5,613,219 A | 3/1997 | Vogel et al. |
| 5,675,590 A | 10/1997 | Alamouti et al. |
| 5,680,419 A * | 10/1997 | Bottomley ............... 375/347 |
| 5,781,845 A | 7/1998 | Dybdal et al. |
| 5,787,131 A | 7/1998 | Bottomley |
| 5,790,570 A | 8/1998 | Heegard et al. |
| 5,819,168 A | 10/1998 | Golden et al. |
| 5,822,380 A * | 10/1998 | Bottomley ............... 375/347 |
| 5,838,742 A | 11/1998 | Abu-Dayya |
| 5,848,103 A | 12/1998 | Weerackody |
| 5,859,870 A | 1/1999 | Tsujimoto |
| 5,924,034 A | 7/1999 | Dupuy |
| 5,933,421 A | 8/1999 | Alamouti et al. |
| 5,943,372 A | 8/1999 | Gans et al. |
| 5,949,833 A | 9/1999 | Weerackody |
| 5,960,039 A | 9/1999 | Martin et al. |
| 5,991,273 A | 11/1999 | Abu Dayya |
| 5,991,331 A | 11/1999 | Chennakeshu et al. |
| 5,999,826 A | 12/1999 | Whinnett |
| 6,031,474 A | 2/2000 | Kay et al. |
| 6,034,987 A | 3/2000 | Chennakeshu et al. |
| 6,038,263 A | 3/2000 | Kotzin et al. |
| 6,038,272 A | 3/2000 | Golden et al. |
| 6,044,120 A | 3/2000 | Bar-David et al. |
| 6,067,324 A | 5/2000 | Harrison |
| 6,081,566 A * | 6/2000 | Molnar et al. ............... 375/347 |
| 6,088,408 A | 7/2000 | Calderbank et al. |
| 6,094,465 A | 7/2000 | Stein et al. |
| 6,097,771 A | 8/2000 | Foschini |
| 6,101,399 A | 8/2000 | Raleigh et al. |
| 6,115,427 A | 9/2000 | Calderbank |
| 6,144,711 A | 11/2000 | Raleigh |
| 6,144,771 A | 11/2000 | Li et al. |
| 6,154,485 A | 11/2000 | Harrison |
| 6,173,005 B1 | 1/2001 | Kotzin |
| 6,178,196 B1 | 1/2001 | Naguib et al. |
| 6,185,258 B1 | 2/2001 | Alamouti et al. |
| 6,185,266 B1 | 2/2001 | Kuchi et al. |
| 6,188,736 B1 | 2/2001 | Lo et al. |
| 6,192,256 B1 | 2/2001 | Whinnett |
| 6,298,082 B1 | 10/2001 | Harrison |
| 6,304,581 B1 | 10/2001 | Chen et al. |
| 6,317,411 B1 | 11/2001 | Whinnett et al. |
| 6,317,466 B1 | 11/2001 | Foschini et al. |
| 6,327,299 B1 | 12/2001 | Meszko |
| 6,377,631 B1 | 4/2002 | Raleigh |
| 6,393,074 B1 | 5/2002 | Mandyam et al. |
| 6,411,257 B1 | 6/2002 | Sorelius et al. |
| 6,411,612 B1 | 6/2002 | Halford et al. |
| 6,430,231 B1 | 8/2002 | Calderbank et al. |
| 6,452,981 B1 | 9/2002 | Raleigh et al. |
| 6,470,043 B1 | 10/2002 | Lo et al. |
| 6,501,803 B1 | 12/2002 | Alamouti et al. |
| 6,542,556 B1 | 4/2003 | Kuchi et al. |
| 6,549,585 B2 | 4/2003 | Naguib et al. |
| 6,728,307 B1 | 4/2004 | Derryberry et al. |
| 6,741,635 B2 | 5/2004 | Lo et al. |
| 6,775,329 B2 | 8/2004 | Alamouti et al. |
| 6,807,240 B2 | 10/2004 | Alamouti et al. |
| 6,853,688 B2 | 2/2005 | Alamouti et al. |
| 6,888,899 B2 | 5/2005 | Raleigh et al. |
| 7,145,971 B2 | 12/2006 | Raleigh et al. |
| 2004/0157646 A1 | 8/2004 | Raleigh et al. |
| 2005/0157810 A1 | 7/2005 | Raleigh et al. |

FOREIGN PATENT DOCUMENTS

| | | |
|---|---|---|
| CA | 2276207 | 5/1999 |
| DE | 29824760 | 6/2002 |
| DE | 29824761 | 6/2002 |
| DE | 29824762 | 6/2002 |
| DE | 29824763 | 6/2002 |
| DE | 29824765 | 6/2002 |
| EP | 0767546 | 4/1997 |
| EP | 1016228 | 7/2000 |
| GB | 2237706 | 5/1991 |
| GB | 2280575 | 1/1995 |
| GB | 2290010 | 12/1995 |
| GB | 2311445 | 9/1997 |
| JP | 63-286027 | 11/1988 |
| WO | 91/20142 | 12/1991 |
| WO | 95/22214 | 8/1995 |
| WO | 97/24849 | 7/1997 |
| WO | 98/09385 | 3/1998 |
| WO | 99/23766 | 5/1999 |
| WO | 00/11806 | 3/2000 |
| WO | 00/18056 | 3/2000 |
| WO | 00/49780 | 8/2000 |
| WO | 00/51265 | 8/2000 |
| WO | 01/19013 | 3/2001 |
| WO | 01/54305 | 7/2001 |
| WO | 01/56218 | 8/2001 |
| WO | 01/63826 | 8/2001 |
| WO | 01/69814 | 9/2001 |

OTHER PUBLICATIONS

Naguib, Ayman et al., "A Space-Time Coding Modem for High-Data-Rate Wireless Communications," IEEE Journal On Selected Areas in Communications, Oct. 1998, pp. 1459-1478, The Institute of Electrical and Electronics Engineers, Inc., New York, NY.

Pickholtz, R.L. et al., "Theory of Spread Spectrum Communications-A Tutorial," IEEE Transactions on Communications, 30(5):855-884, (1982).

Sampei, Seiichi et al., "Rayleigh Fading Compensation Method for 16QAM in Digital Land Mobile Radio Channels," Proceeding of the 1989 IEEE Vehicular Technology Conference, May 1989, pp. 640-646, The Institute of Electrical and Electronics Engineers, Inc., New York, NY.

Seshadri, N. et al., "Advanced Techniques for Modulation, Error Correction, Channel Equalization and Diversity," AT&T Tech. Journal 47(4): 48-63, Jul. 1993.

Seshadri, N. et al., "Space-Time Codes for Wireless Communication: Code Construction," IEEE 47th Vehicular Technology Conf., Phoenix, pp. 637-641, May 1997.

Seshadri, N. et al., "Two Signaling Schemes for Improving the Error Performance of FDD Transmission Systems Using Transmitter Antenna Diversity," Proceeding of the 1993 IEEE Vehicular Technology Conference (VTC 43rd), May 1993, pp. 508-511, The Institute of Electrical and Electronics Engineers, Inc., New York, NY.

Tarokh, V. et al., "Space Time Codes for High Data Rate Wireless Communication: Performance Criteria in the Presence of Channel Estimation Errors, Mobility, and Multiple Paths", IEEE Transactions on Communications 47 (2):199-207, (1999).

Tarokh, V., et al., "Space-Time Codes for High Data Rate Wireless Communication: Performance Criteria," IEEE International Conference on Communications, Montreal, 1:299-303, Jun. 1997.

Tarokh, Vahid et al., "Combined Array Processing and Space-Time Coding," IEEE Transactions on Information Theory, May 1999, pp. 1121-1128, vol. 45, No. 4, The Institute of Electrical and Electronics Engineers, Inc., New York, NY.

Tarokh, Vahid et al., "Space-Time Codes for High Data Rate Wireless Communication: Performance Criterion and Code Construction," IEEE Transactions on Information Theory, Mar. 1998, pp. 744-765, vol. 44, No. 2, The Institute of Electrical and Electronics Engineers, Inc., New York, NY.

Ungerboeck, Gottfried, "Channel Coding with Multilevel/Phase Signals," IEEE Transactions on Information Theory, Jan. 1982, pp. 55-67, vol. IT-28, No. 1, The Institute of Electrical and Electronics Engineers, Inc., New York, NY.

Weerackody, V., "Diversity for the Direct-Sequence Spread Spectrum System Using Multiple Transmit Antennas," Proceedings of the IEEE International conference on Communications, May 23-26, 1993, Geneva, vol. 3, pp. 1775-1779.

Winters, J.H., "The Diversity Gain of Transmit Diversity in Wireless Systems with Rayleigh Fading," 1998, IEEE, pp. 119-123.

Winters, J.H., Salz, J., Gitlin, R.D., "The Impact of Antenna Diversity on the Capacity of Wireless Communications Systems," IEEE Transactions on Communications, vol. 42, No. 2, Feb./Mar./Apr. 1994, pp. 1740-1751, IEEE Communications Society, New York, NY.

Wittneben, A., "A New Bandwidth Efficient Transmit Antenna Modulation Diversity Scheme For Linear Digital Modulation," Proceeding of the 1993 IEEE International Conference on Communications (IICC '93), May 1993, pp. 1630-1634, The Institute of Electrical and Electronics Engineers, Inc., New York, NY.

Wittneben, A., "Basestation modulation diversity for digital SIMULCAST," Proceeding of the 1991 IEEE Vehicular Technology Conference, May 1991, pp. 848-853, The Institute of Electrical and Electronics Engineers, Inc., New York, NY.

Alamouti, S. M., "Trellis-Coded Modulation and Transmit Diversity: Design Criteria and Performance Evaluation," 0-7803-5106-1/98, pp. 703-708, 1998 IEEE.

Alamouti, Siavash M., "A Simple Transmit Diversity Technique for Wireless Communications," IEEE Journal on Select Areas in Communications, Oct. 1998, pp. 1451-1458, vol. 16, No. 8, The Institute of Electrical and Electronics Engineers, Inc., New York, NY.

Blanco, M.A. & Zdunek, K., "Performance and Optimization of Switched Diversity Systems for the Detection of Signals with Rayleigh Fading," IEEE Transactions on Communications, 27(12):1887-1895, (Dec. 1979).

Blanco, M.A. & Zdunek, K., "On the Optimization of Simple Switched Diversity Receivers," 1978 IEEE Conference on Communications and Power, Montreal, Canada, pp. 114-117, (1978).

Calderbank, A. et al., "Space-Time Codes for Wireless Communication," 1997 IEEE, ISIT 1997, Jun. 29-Jul. 4, pp. 146, Ulm, Germany.

Cavers, James K., "An Analysis of Pilot Symbol Assisted Modulation for Rayleigh Fading Channels," IEEE Transactions on Vehicular Technology, Nov. 1991, pp. 686-693, vol. 40, No. 4, The Institute of Electrical and Electronics Engineers, Inc., New York, NY.

Foschini, G.J. and Gans, M.J., "On Limits or Wireless Communications in a Fading Environment when Using Multiple Antennas," Wireless Personal Communications 6:311-335, (1998).

Foschini, G.J., "Layered Space-Time Architecture for Wireless Communication in a Fading Environment when Using Mulit-Element Antennas", Bell Technical Labs Journal, pp. 41-59, 1996.

Hinderling, J. et al., "CDMA Mobile Station Modem ASIC," IEEE 1992 Custom Integrated Circuits Conference pp. 10.2.1-10.2.5, (1992).

Hiroike, A. et al., "Combined Effects of Phase Sweeping Transmitter Diversity and Channel Coding," IEEE Transactions on Vehicular Technology, vol. 41, No. 2, May 1992, The Institute of Electrical and Electronics Engineers, Inc., New York, NY.

Kerr, R. et al., "The CDMA Digital Cellular System: An ASIC Overview," IEEE 1992 Custom Integrated Circuits Conference pp. 10.1.1-10.1.7, (1992).

* cited by examiner

RECEIVER DIVERSITY TECHNIQUE FOR WIRELESS COMMUNICATIONS

REFERENCE TO RELATED APPLICATIONS

This application is a continuation of U.S. patent application Ser. No. 10/873,567, filed Jun. 22, 2004 (now U.S. Pat. No. 7,120,200) which is a continuation of U.S. patent application Ser. No. 09/730,151, filed Dec. 5, 2000 (now U.S. Pat. No. 6,775,329), which is a continuation of U.S. patent application Ser. No. 09/074,224, filed May 7, 1998 (now U.S. Pat. No. 6,185,258 issued Feb. 6, 2001) and claims the benefit of U.S. Provisional Application No. 60/059,016, filed Sep. 16, 1997; of U.S. Provisional Application No. 60/059,219, filed Sep. 18, 1997; and of U.S. Provisional Application No. 60/063,780, filed Oct. 31, 1997, all of which are hereby incorporated by reference as to their entire contents.

BACKGROUND OF THE INVENTION

This invention relates to wireless communication and, more particularly, to techniques for effective wireless communication in the presence of fading and other degradations.

The most effective technique for mitigating multipath fading in a wireless radio channel is to cancel the effect of fading at the transmitter by controlling the transmitter's power. That is, if the channel conditions are known at the transmitter (on one side of the link), then the transmitter can pre-distort the signal to overcome the effect of the channel at the receiver (on the other side). However, there are two fundamental problems with this approach. The first problem is the transmitter's dynamic range. For the transmitter to overcome an x dB fade, it must increase its power by x dB which, in most cases, is not practical because of radiation power limitations, and the size and cost of amplifiers. The second problem is that the transmitter does not have any knowledge of the channel as seen by the receiver (except for time division duplex systems, where the transmitter receives power from a known other transmitter over the same channel). Therefore, if one wants to control a transmitter based on channel characteristics, channel information has to be sent from the receiver to the transmitter, which results in throughput degradation and added complexity to both the transmitter and the receiver.

Other effective techniques are time and frequency diversity. Using time interleaving together with coding can provide diversity improvement. The same holds for frequency hopping and spread spectrum. However, time interleaving results in unnecessarily large delays when the channel is slowly varying. Equivalently, frequency diversity techniques are ineffective when the coherence bandwidth of the channel is large (small delay spread).

It is well known that in most scattering environments antenna diversity is the most practical and effective technique for reducing the effect of multipath fading. The classical approach to antenna diversity is to use multiple antennas at the receiver and perform combining (or selection) to improve the quality of the received signal.

The major problem with using the receiver diversity approach in current wireless communication systems, such as IS-136 and GSM, is the cost, size and power consumption constraints of the receivers. For obvious reasons, small size, weight and cost are paramount. The addition of multiple antennas and RF chains (or selection and switching circuits) in receivers is presently not be feasible. As a result, diversity techniques have often been applied only to improve the up-link (receiver to base) transmission quality with multiple antennas (and receivers) at the base station. Since a base station often serves thousands of receivers, it is more economical to add equipment to base stations rather than the receivers Recently, some interesting approaches for transmitter diversity have been suggested. A delay diversity scheme was proposed by A. Wittneben in "Base Station Modulation Diversity for Digital SIMULCAST," Proceeding of the 1991 IEEE Vehicular Technology Conference (VTC 41 st), PP. 848-853, May 1991, and in "A New Bandwidth Efficient Transmit Antenna Modulation Diversity Scheme For Linear Digital Modulation," in Proceeding of the 1993 IEEE International Conference on Communications (IICC '93), PP. 1630-1634, May 1993. The proposal is for a base station to transmit a sequence of symbols through one antenna, and the same sequence of symbols—but delayed—through another antenna.

U.S. Pat. No. 5,479,448, issued to Nambirajan Seshadri on Dec. 26, 1995, discloses a similar arrangement where a sequence of codes is transmitted through two antennas. The sequence of codes is routed through a cycling switch that directs each code to the various antennas, in succession. Since copies of the same symbol are transmitted through multiple antennas at different times, both space and time diversity are achieved. A maximum likelihood sequence estimator (MLSE) or a minimum mean squared error (MMSE) equalizer is then used to resolve multipath distortion and provide diversity gain. See also N. Seshadri, J. H. Winters, "Two Signaling Schemes for Improving the Error Performance of FDD Transmission Systems Using Transmitter Antenna Diversity," *Proceeding of the* 1993 *IEEE Vehicular Technology Conference* (VTC 43rd), pp. 508-511, May 1993; and J. H. Winters, "The Diversity Gain of Transmit Diversity in Wireless Systems with Rayleigh Fading," *Proceeding of the* 1994 *ICC/SUPERCOMM,* New Orleans, Vol. 2, PP. 1121-1125, May 1994.

Still another interesting approach is disclosed by Tarokh, Seshadri, Calderebank and Naguib in U.S. application, Ser. No. 08/847,635, filed Apr. 25, 1997 (based on a provisional application filed Nov. 7, 1996) now U.S. Pat. No. 6,115,427, where symbols are encoded according to the antennas through which they are simultaneously transmitted, and are decoded using a maximum likelihood decoder. More specifically, the process at the transmitter handles the information in blocks of M1 bits, where M1 is a multiple of M2, i.e. M1=k*M2. It converts each successive group of M2 bits into information symbols (generating thereby k information symbols), encodes each sequence of k information symbols into n channel codes (developing thereby a group of n channel codes for each sequence of k information symbols), and applies each code of a group of codes to a different antenna.

SUMMARY

The problems of prior art systems are overcome, and an advance in the art is realized with a simple block coding arrangement where symbols are transmitted over a plurality of transmit channels and the coding comprises only of simple arithmetic operations, such as negation and conjugation. The diversity created by the transmitter utilizes space diversity and either time diversity or frequency diversity. Space diversity is effected by redundantly transmitting over a plurality of antennas; time diversity is effected by redundantly transmitting at different times; and frequency diversity is effected by redundantly transmitting at different frequencies. Illustratively, using two transmit antennas and a single receive antenna, one of the disclosed embodiments provides the same diversity gain as the maximal-ratio receiver combining (MRRC) scheme with one transmit antenna and two receive antennas. The novel approach does not require any bandwidth expansion or feedback from the receiver to the transmitter, and has the same decoding complexity as the MRRC. The diversity improvement is equal to applying maximal-ratio receiver combining (MRRC) at the receiver with the same number of antennas. The principles of this invention are applicable to arrangements with more than two antennas, and an illustrative embodiment is disclosed using the same space block code with two transmit and two receive antennas. This scheme provides the same diversity gain as four-branch MRRC.

DETAIL DESCRIPTION

In accordance with the principles of this invention, effective communication is achieved with encoding of symbols that comprises merely negations and conjugations of symbols (which really is merely negation of the imaginary part) in combination with a transmitter created diversity. Space diversity and either frequency diversity or time diversity are employed.

Figure 1:
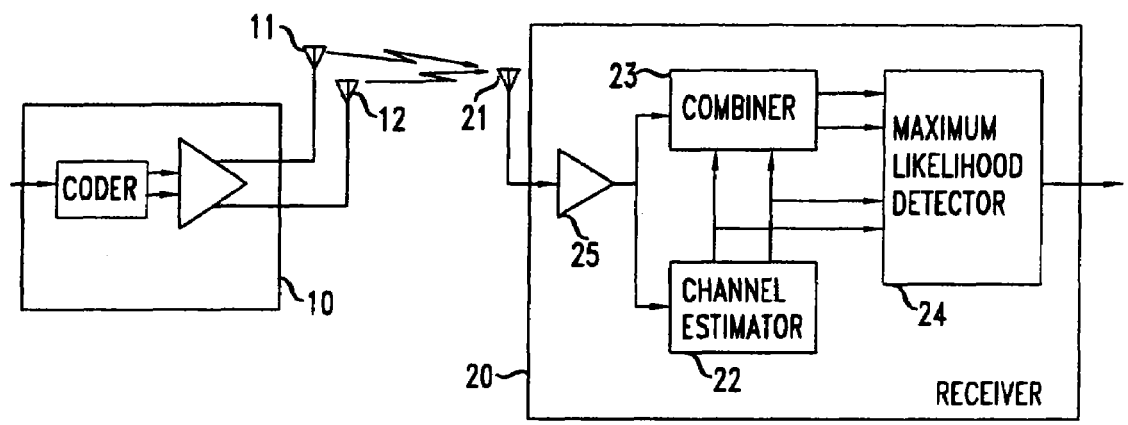
FIG. 1 is a block diagram of a first embodiment in accordance with the principles of this invention.

FIG. 1 presents a block diagram of an arrangement where the two controllable aspects of the transmitter that are used are space and time. That is, the FIG. 1 arrangement includes multiple transmitter antennas (providing space diversity) and employs multiple time intervals. Specifically, transmitter 10 illustratively comprises antennas 11 and 12, and it handles incoming data in blocks n symbols, where n is the number of transmitter antennas, and in the illustrative embodiment of FIG. 1, it equals 2, and each block takes n symbol intervals to transmit. Also illustratively, the FIG. 1 arrangement includes a receiver 20 that comprises a single antenna 21.

At any given time, a signal sent by a transmitter antenna experiences interference effects of the traversed channel, which consists of the transmit chain, the air-link, and the receive chain. The channel may be modeled by a complex multiplicative distortion factor composed of a magnitude response and a phase response. In the exposition that follows therefore, the channel transfer function from transmit antenna 11 to receive antenna 21 is denoted by $h_0$ and from transmit antenna 12 to receive antenna 21 is denoted by $h_1$, where:

$$h_0 = \alpha_0 e^{j\Theta_{ij}}$$

$$h_1 = \alpha_1 e^{j\Theta_1}. \quad (1)$$

Noise from interference and other sources is added at the two received signals and, therefore, the resulting baseband signal received at any time and outputted by reception and amplification section 25 is $$r(t) = \alpha_0 e^{j\Theta_{ij}} s_i + \alpha_1 e^{j\Theta_1} s_j + n(t), \quad (2)$$

where $s_i$ and $s_j$ are the signals being sent by transmit antenna 11 and 12, respectively.

As indicated above, in the two-antenna embodiment of FIG. 1 each block comprises two symbols and it takes two symbol intervals to transmit those two symbols. More specifically, when symbols $s_i$ and $s_j$ need to be transmitted, at a first time interval the transmitter applies signal $s_i$ to antenna 11 and signal $s_j$ to antenna 12, and at the next time interval the transmitter applies signal $-s_1^*$ to antenna 11 and signal $s_0^*$ to antenna 12. This is clearly a very simple encoding process where only negations and conjugations are employed. As demonstrated below, it is as effective as it is simple. Corresponding to the above-described transmissions, in the first time interval the received signal is $$r(t) = h_0 s_i + h_1 s_j + n(t), \quad (3)$$

and in the next time interval the received signal is $$r(t+T) = -h_0 s_j^* + h_1 s_i^* + n(t+T). \quad (4)$$

Table 1 illustrates the transmission pattern over the two antennas of the FIG. 1 arrangement for a sequence of signals $\{s_0, s_1, s_2, s_3, s_4, s_5, \ldots\}$.

TABLE 1

|  | Time: | | | | | |
|---|---|---|---|---|---|---|
|  | t | t + T | t + 2T | t + 3T | t + 4T | t + 5T |
| Antenna 11 | $s_0$ | $-s_1^*$ | $s_2$ | $-s_3^*$ | $s_4$ | $-s_5^*$ ... |
| Antenna 12 | $s_1$ | $s_0^*$ | $s_3$ | $s_2^*$ | $s_5$ | $s_4^*$ ... |

The received signal is applied to channel estimator 22, which provides signals representing the channel characteristics or, rather, the best estimates thereof. Those signals are applied to combiner 23 and to maximum likelihood detector 24. The estimates developed by channel estimator 22 can be obtained by sending a known training signal that channel estimator 22 recovers, and based on the recovered signal the channel estimates are computed. This is a well known approach.

Combiner 23 receives the signal in the first time interval, buffers it, receives the signal in the next time interval, and combines the two received signals to develop signals $$\tilde{s}_i = \tilde{h}_0^* r(t) + \tilde{h}_1 r^*(t+T)$$

$$\tilde{s}_j = \tilde{h}_1^* r(t) - \tilde{h}_0 r^*(t+T). \quad (5)$$

Substituting equation (1) into (5) yields $$\tilde{s}_i = (\tilde{\alpha}_0^2 + \tilde{\alpha}_1^2) s_i + \tilde{h}_0^* n(t) + \tilde{h}_1 n^*(t+T)$$

$$\tilde{s}_j = (\tilde{\alpha}_0^2 + \tilde{\alpha}_1^2) s_j - \tilde{h}_0 n^*(t+T) + \tilde{h}_1^* n(t), \quad (6)$$

where $\tilde{\alpha}_0^2 = \tilde{h}_0 \tilde{h}_0^*$ and $\tilde{\alpha}_1^2 = \tilde{h}_1 \tilde{h}_1^*$, demonstrating that the signals of equation (6) are, indeed, estimates of the transmitted signals (within a multiplicative factor). Accordingly, the signals of equation (6) are sent to maximum likelihood detector 24.

In attempting to recover $s_i$, two kind of signals are considered: the signals actually received at time t and t+T, and the signals that should have been received if $s_i$ were the signal that was sent. As demonstrated below, no assumption is made regarding the value of $s_j$. That is, a decision is made that $s_i = s_x$ for that value of x for which $$d^2[r(t), (h_0 s_x + h_1 s_j)] + d^2[r(t+T), (-h_1 s_j^* + h_0 s_x^*)]$$

is less than $$d^2[r(t),(h_0s_k+h_1s_j)]+d^2[r(t+T),(-h_1s_j^*+h_0s_k^*)], \quad (7)$$

where $d^2(x,y)$ is the squared Euclidean distance between signals x and y, i.e., $$d^2(x,y)=|x-y|^2.$$

Recognizing that $\tilde{h}_0=h_0+$noise that is independent of the transmitted symbol, and that $\tilde{h}_1=h_1+$noise that is independent of the transmitted symbol, equation (7) can be rewritten to yield $$(\alpha_0^2+\alpha_1^2)|s_x|^2-\tilde{s}_i s_x^*-\tilde{s}_i^* s_x \leq (\alpha_0^2+\alpha_1^2)|s_k|^2-\tilde{s}_i s_k^*-\tilde{s}_i^* s_k \quad (8)$$

where $\alpha_0^2=h_0h_0^*$ and $\alpha_1^2=h_1h_1^*$; or equivalently, $$(\alpha_0^2+\alpha_1^2-1)|s_x|^2+d^2(\tilde{s}_i,s_x) \leq (\alpha_0^2+\alpha_1^2-1)|s_k|^2+d^2(\tilde{s}_i,s_k). \quad (9)$$

In Phase Shift Keying modulation, all symbols carry the same energy, which means that $|s_x|^2=|s_k|^2$ and, therefore, the decision rule of equation (9) may be simplified to choose signal $\hat{s}_i=s_x$ iff $d^2(\tilde{s}_i,s_x) \leq d^2(\tilde{s}_i,s_k).$ (10)

Thus, maximum likelihood detector 24 develops the signals $s_k$ for all values of k, with the aid of $\tilde{h}_0$ and $\tilde{h}_1$ from estimator 22, develops the distances $d^2(\tilde{s}_i,s_k)$, identifies x for which equation (10) holds and concludes that $\hat{s}_i=s_x$. A similar process is applied for recovering $\hat{s}_j$.

Figure 2:
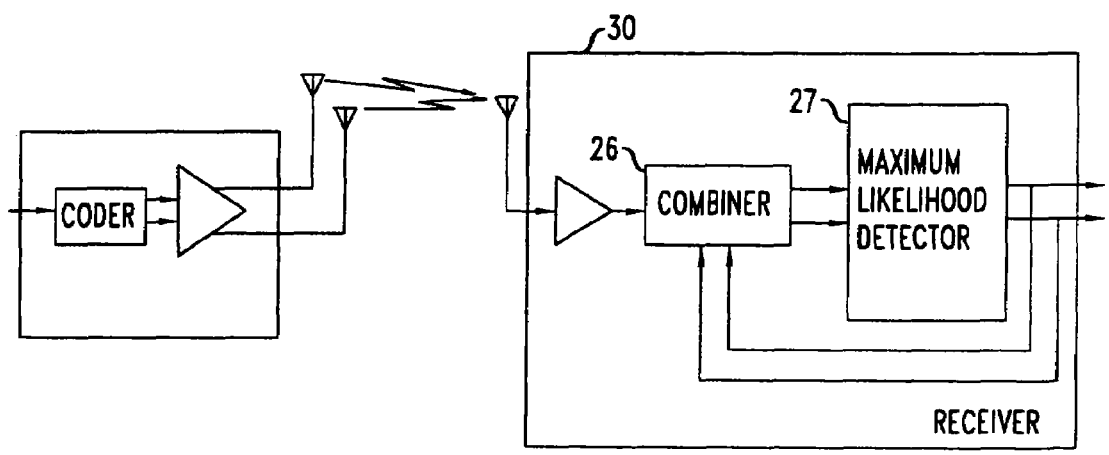
FIG. 2 presents a block diagram of a second embodiment, where channel estimates are not employed.

In the above-described embodiment each block of symbols is recovered as a block with the aid of channel estimates $\tilde{h}_0$ and $\tilde{h}_1$. However, other approaches to recovering the transmitted signals can also be employed. Indeed, an embodiment for recovering the transmitted symbols exists where the channel transfer functions need not be estimated at all, provided an initial pair of transmitted signals is known to the receiver (for example, when the initial pair of transmitted signals is prearranged). Such an embodiment is shown in FIG. 2, where maximum likelihood detector 27 is responsive solely to combiner 26. (Elements in FIG. 3 that are referenced by numbers that are the same as reference numbers in FIG. 1 are like elements.) Combiner 26 of receiver 30 develops the signals $$r_0=r(t)=h_0s_0+h_1s_1+n_0$$

$$r_1=r(t+T)=h_1s_0^*-h_0s_1^*+n_1$$

$$r_2=r(t+2T)=h_0s_2+h_1s_3+n_2$$

$$r_3=r(t+3T)=h_1s_2^*-h_0s_3^*+n_3, \quad (11)$$

then develops intermediate signals A and B $$A=r_0r_3^*-r_2r_1^*$$

$$B=r_2r_0^*+r_1r_3^*, \quad (12)$$

and finally develops signals $$\tilde{s}_2=As_1^*+Bs_0$$

$$\tilde{s}_3=-As_0^*+Bs_1, \quad (13)$$

where $N_3$ and $N_4$ are noise terms. It may be noted that signal $r_2$ is actually $r_2=h_0\hat{s}_2+h_1\hat{s}_3=h_0s_2+h_1s_3+n_2$, and similarly for signal $r_3$. Since the makeup of signals A and B makes them also equal to $$A=(\alpha_0^2+\alpha_1^2)(s_2s_1-s_3s_0)+N_1$$

$$B=(\alpha_0^2+\alpha_1^2)(s_2s_0^*+s_3s_1^*)+N_2, \quad (14)$$

where N1 and N2 are noise terms, it follows that signals $\tilde{s}_2$ and $\tilde{s}_3$ are equal to $$\tilde{s}_2=(\alpha_0^2+\alpha_1^2)(|s_0|^2+|s_1|^2)s_2+N_3$$

$$\tilde{s}_3=(\alpha_0^2+\alpha_1^2)(|s_0|^2+|s_1|^2)s_3+N_4. \quad (15)$$

When the power of all signals is constant (and normalized to 1) equation (15) reduces to $$\tilde{s}_2=(\alpha_0^2+\alpha_1^2)s_2+N_3$$

$$\tilde{s}_3=(\alpha_0^2+\alpha_1^2)s_3+N_4. \quad (16)$$

Hence, signals $\tilde{s}_2$ and $\tilde{s}_3$ are, indeed, estimates of the signals $s_2$ and $s_3$ (within a multiplicative factor). Lines 28 and 29 demonstrate the recursive aspect of equation (13), where signal estimates $\tilde{s}_2$ and $\tilde{s}_3$ are evaluated with the aid of recovered signals $s_0$ and $s_1$ that are fed back from the output of the maximum likelihood detector.

Signals $\tilde{s}_2$ and $\tilde{s}_3$ are applied to maximum likelihood detector 24 where recovery is effected with the metric expressed by equation (10) above. As shown in FIG. 2, once signals $s_2$ and $s_3$ are recovered, they are used together with received signals $r_2,r_3,r_4$, and $r_5$ to recover signals $s_4$ and $s_5$, and the process repeats.

Figure 3:
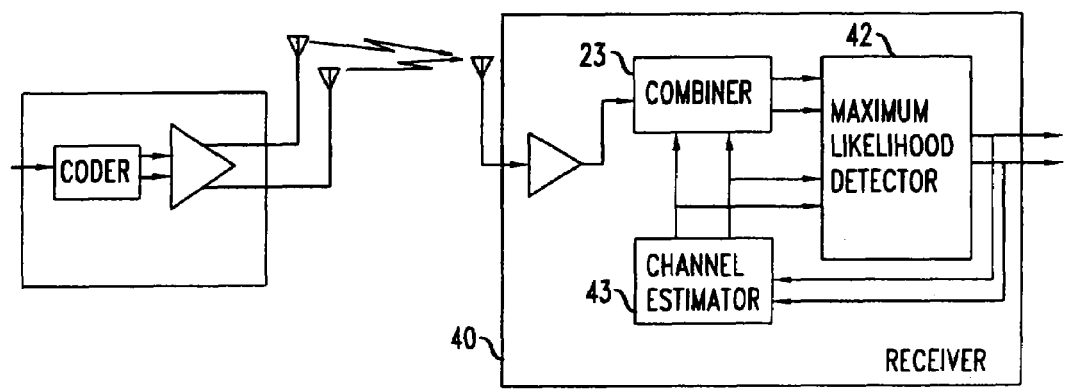
FIG. 3 shows a block diagram of a third embodiment, where channel estimates are derived from recovered signals.

FIG. 3 depicts an embodiment that does not require the constellation of the transmitted signals to comprise symbols of equal power. (Elements in FIG. 3 that are referenced by numbers that are the same as reference numbers in FIG. 1 are like elements.) In FIG. 3, channel estimator 43 of receiver 40 is responsive to the output signals of maximum likelihood detector 42. Having access to the recovered signals $s_0$ and $s_1$, channel estimator 43 forms the estimates $$\tilde{h}_0 = \frac{r_0s_0^* - r_1s_1}{|s_0|^2+|s_1|^2} = h_0 + \frac{s_0^*n_0 + s_1n_1}{|s_0|^2+|s_1|^2}$$

$$\tilde{h}_1 = \frac{r_0s_1^* - r_1s_0}{|s_0|^2+|s_1|^2} = h_1 + \frac{s_1^*n_0 + s_0n_1}{|s_0|^2+|s_1|^2} \quad (17)$$

and applies those estimates to combiner 23 and to detector 42. Detector 24 recovers signals $s_2$ and $s_3$ by employing the approach used by detector 24 of FIG. 1, except that it does not employ the simplification of equation (9). The recovered signals of detector 42 are fed back to channel estimator 43, which updates the channel estimates in preparation for the next cycle.

Figure 4:
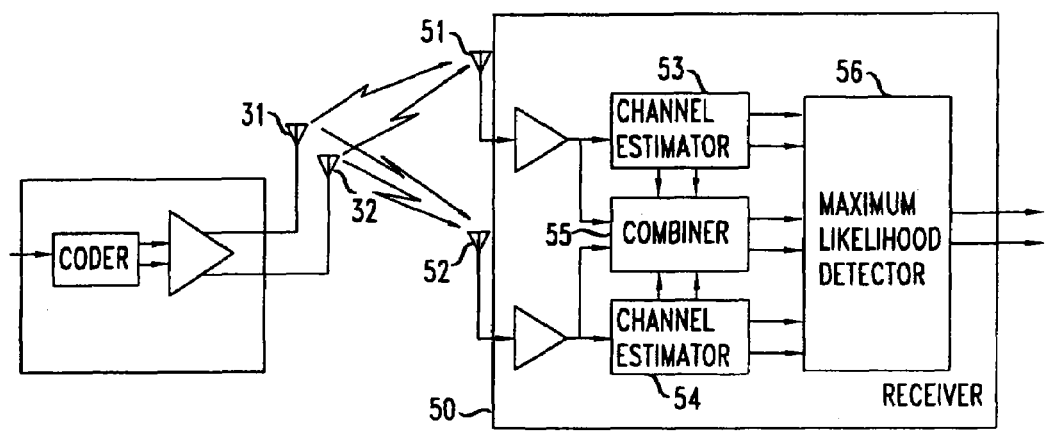
FIG. 4 illustrates an embodiment where two transmitter antennas and two receiver antennas are employed.

The FIGS. 1-3 embodiments illustrate the principles of this invention for arrangements having two transmit antennas and one receive antenna. However, those principles are broad enough to encompass a plurality of transmit antennas and a plurality of receive antennas. To illustrate, FIG. 4 presents an embodiment where two transmit antennas and two receive antennas are used; to wit, transmit antennas 31 and 32, and receive antennas 51 and 52. The signal received by antenna 51 is applied to channel estimator 53 and to combiner 55, and the signal received by antenna 52 is applied to channel estimator 54 and to combiner 55. Estimates of the channel transfer functions $h_0$ and $h_1$ are applied by channel estimator 53 to combiner 55 and to maximum likelihood detector 56. Similarly, estimates of the channel transfer functions $h_2$ and $h_3$ are applied by channel estimator 54 to combiner 55 and to maximum likelihood detector 56. Table 2 defines the channels between the transmit antennas and the receive antennas, and table 3 defines the notion for the received signals at the two receive antennas.

TABLE 2

|  | Antenna 51 | Antenna 52 |
|---|---|---|
| Antenna 31 | $h_0$ | $h_2$ |
| Antenna 32 | $h_1$ | $h_3$ |

TABLE 3

|  | Antenna 51 | Antenna 52 |
|---|---|---|
| Time t | $r_0$ | $r_2$ |
| Time t + T | $r_1$ | $r_3$ |

Based on the above, it can be shown that the received signals are $$r_0 = h_0 s_0 + h_1 s_1 + n_0$$

$$r_1 = -h_0 s_1^* + h_1 s_0^* + n_1$$

$$r_2 = h_2 s_0 + h_3 s_1 + n_2$$

$$r_3 = -h_2 s_1^* + h_3 s_0^* + n_3 \quad (15)$$

where $n_0, n_1, n_2$, and $n_3$ are complex random variable representing receiver thermal noise, interferences, etc.

In the FIG. 4 arrangement, combiner 55 develops the following two signals that are sent to the maximum likelihood detector:

$$\tilde{s}_0 = h_0^* r_0 + h_1 r_1^* + h_2^* r_2 + h_3 r_3^*$$

$$\tilde{s}_1 = h_1^* r_0 - h_0 r_1^* + h_3^* r_2 - h_2 r_3^*. \quad (16)$$

Substituting the appropriate equations results in $$\tilde{s}_0 = (\alpha_0^2 + \alpha_1^2 + \alpha_2^2 + \alpha_3^2) s_0 + h_0^* n_0 + h_1 n_1^* + h_2^* n_2 + h_3 n_3^*$$

$$\tilde{s}_1 = (\alpha_0^2 + \alpha_1^2 + \alpha_2^2 + \alpha_3^2) s_1 + h_1^* n_0 - h_0 n_1^* + h_3^* n_2 - h_2 n_3^*, \quad (17)$$

which demonstrates that the signal $\tilde{s}_0$ and $\tilde{s}_1$ are indeed estimates of the signals $s_0$ and $s_1$. Accordingly, signals $\tilde{s}_0$ and $\tilde{s}_1$ are sent to maximum likelihood decoder 56, which uses the decision rule of equation (10) to recover the signals $\hat{s}_0$ and $\hat{s}_1$.

As disclosed above, the principles of this invention rely on the transmitter to force a diversity in the signals received by a receiver, and that diversity can be effected in a number of ways. The illustrated embodiments rely on space diversity—effected through a multiplicity of transmitter antennas, and time diversity—effected through use of two time intervals for transmitting the encoded symbols. It should be realized that two different transmission frequencies could be used instead of two time intervals. Such an embodiment would double the transmission speed, but it would also increase the hardware in the receiver, because two different frequencies need to be received and processed simultaneously.

The above illustrated embodiments are, obviously, merely illustrative implementations of the principles of the invention, and various modifications and enhancements can be introduced by artisans without departing from the spirit and scope of this invention, which is embodied in the following claims. For example, all of the disclosed embodiments are illustrated for a space-time diversity choice, but as explained above, one could choose the space-frequency pair. Such a choice would have a direct effect on the construction of the receivers.

We claim:

1. A method of receiving a wireless communication from first and second space diverse antennas, the wireless communication being further one of time diverse or frequency diverse, the method comprising the steps of estimating characteristics of a transmit channel over which signals are received from said space diverse antennas and outputting said estimated characteristics to a signal combiner and a maximum likelihood detector, the characteristics being related to a time difference between sequential transmissions from said space diverse antennas;

combining said signals received from said first and second space diverse antennas and outputting said combined signals to said maximum likelihood detector as two output data signals responsive to said estimated channel characteristics;

and detecting respective transmitted signals in the presence of noise via said maximum likelihood detector responsive to said estimated channel characteristics.

2. A method of receiving a wireless communication as recited in claim 1, further comprising initially receiving a known transmitted signal.

3. A method of receiving a wireless communication as recited in claim 1, further comprising feeding back the detected transmitted signals.

4. A method of receiving a wireless communication from first and second space diverse antennas, the wireless communication comprising first, second, third and fourth transmitted signals, the method comprising combining first and second transmitted signals and noise to develop a first received signal and combining conjugates of said first and said second transmitted signals and said noise to develop a second received signal, developing channel estimates of the first and second transmitted signals from said first and second received signals and applying said channel estimates to a maximum likelihood detector;

recovering, using said maximum likelihood detector, said first and second transmitted signals responsive to said developed channel estimates; and developing further channel estimates to recover said third and fourth transmitted signals.

5. A method of receiving a wireless communication as recited in claim 4 further comprising initially receiving a known transmitted signal.

6. A method of receiving a wireless communication as recited in claim 4 further comprising feeding back the recovered first, second, third and fourth transmitted signals.

7. An electronic circuit for decoding wireless communication signals, comprising:

a combiner adapted to receive one of an incoming time diverse or frequency diverse signal representing blocks of encoded symbols, wherein the blocks of symbols have been transmitted by a plurality of spatially diverse antennas, wherein the combiner is configured to combine the received encoded symbols, and wherein the received encoded symbols include negating selected symbols and conjugating selected symbols, and a maximum likelihood detector configured to receive said one of a time diverse or a frequency diverse signal, the detector receiving the combined encoded signals and recovering transmitted signals using a channel transfer function.

8. An electronic circuit as recited in claim 7, the combiner initially receiving a known transmitted signal.

9. An electronic circuit as recited in claim 7, the maximum likelihood detector feeding back the recovered transmitted signals.

10. A method of receiving a wireless communication from first and second space diverse antennas, the wireless communication being further one of time diverse or frequency diverse, the method comprising the steps of
    estimating characteristics of a transmit channel over which signals are received from said space diverse antennas and outputting said estimated characteristics to a signal combiner and a detector using a decision rule, the characteristics being related to a time difference between sequential transmissions from said space diverse antennas;
    combining said signals received from said first and second space diverse antennas and outputting said combined signals to said detector as two output data signals responsive to said estimated channel characteristics;
    and detecting respective transmitted signals in the presence of noise via said detector using said decision rule responsive to said estimated channel characteristics.

11. A method of receiving a wireless communication as recited in claim 10 further comprising receiving a known transmitted signal.

12. A method of receiving a wireless communication as recited in claim 10 further comprising feeding back the detected transmitted signals.

13. A method of receiving a wireless communication from first and second space diverse antennas, the wireless communication being further one of time diverse or frequency diverse, the method comprising the steps of
    estimating characteristics of a transmit channel over which signals are received from said space diverse antennas and outputting said estimated characteristics to a signal combiner and a detector, the characteristics being related to a time difference between sequential transmissions from said space diverse antennas;
    combining said signals received from said first and second space diverse antennas and outputting said combined signals to said detector as two output data signals responsive to said estimated channel characteristics;
    and detecting respective transmitted signals in the presence of noise via said detector responsive to said estimated channel characteristics.

14. A method of receiving a wireless communication as recited in claim 13, further comprising initially receiving a known transmitted signal.

15. A method of receiving a wireless communication as recited in claim 13, further comprising feeding back the detected transmitted signals.

16. A method of receiving a wireless communication from first and second space diverse antennas, the wireless communication comprising first, second, third and fourth transmitted signals, the method comprising
    combining first and second transmitted signals and noise to develop a first received signal and combining conjugates of said first and said second transmitted signals and said noise to develop a second received signal,
    developing channel estimates of the first and second transmitted signals from said first and second received signals and applying said channel estimates to a decoder using a decision rule;
    recovering, using said decoder, said first and second transmitted signals responsive to said developed channel estimates; and
    developing further channel estimates to recover said third and fourth transmitted signals using said decoder.

17. A method of receiving a wireless communication as recited in claim 16 further comprising initially receiving a known transmitted signal.

18. A method of receiving a wireless communication as recited in claim 16 further comprising feeding back the recovered first, second, third and fourth transmitted signals.

19. An electronic circuit for decoding wireless communication signals, comprising:
    a combiner adapted to receive one of an incoming time diverse or frequency diverse signal representing blocks of encoded symbols, wherein the blocks of symbols have been transmitted by a plurality of spatially diverse antennas, wherein the combiner is configured to combine the received encoded symbols, and wherein the received encoded symbols include negating selected symbols and conjugating selected symbols, and
    a detector configured to receive said one of a time diverse or a frequency diverse signal, the detector receiving the combined encoded signals and recovering transmitted signals using a channel transfer function.

20. An electronic circuit as recited in claim 19, the combiner initially receiving a known transmitted signal.

21. An electronic circuit as recited in claim 19, the detector feeding back the recovered transmitted signals.

22. An electronic circuit as recited in claim 19, wherein said transmitted symbol blocks are distorted by a complex multiplication distortion factor composed of a magnitude and a phase response, said channel transfer function being related to said complex multiplication distortion factor.

* * * * *

UNITED STATES PATENT AND TRADEMARK OFFICE
CERTIFICATE OF CORRECTION

PATENT NO. : 7,386,077 B2  
APPLICATION NO. : 11/536474  
DATED : June 10, 2008  
INVENTOR(S) : Siavash Alamouti and Vahid Tarokh Page 1 of 1

It is certified that error appears in the above-identified patent and that said Letters Patent is hereby corrected as shown below:

Title Page, Col. 2, Abstract, line 7, please replace "symbols" with --symbols.--

Col. 3, lines 58-60, please replace formula (1) with the following formula:
$$h_0 = \alpha_0 e^{j\theta_0}$$
$$-- \ h_1 = \alpha_1 e^{j\theta_1} \ --$$

Col. 3, line 67, please replace formula (2) with the following formula:
$$-- \ r(t) = \alpha_0 e^{j\theta_0} s_i + \alpha_1 e^{j\theta_1} s_j + n(t), \ --$$

Col. 8, line 61, Claim 7, please replace "negating" with --negated--

Col. 8, line 62, Claim 7, please replace "conjugating" with --conjugated--

Col. 10, line 35, Claim 19, please replace "negating" with --negated--

Col. 10, line 36, Claim 19, please replace "conjugating" with --conjugated--

Signed and Sealed this

First Day of December, 2009

David J. Kappos  
*Director of the United States Patent and Trademark Office*